UNITED STATES PATENT OFFICE.

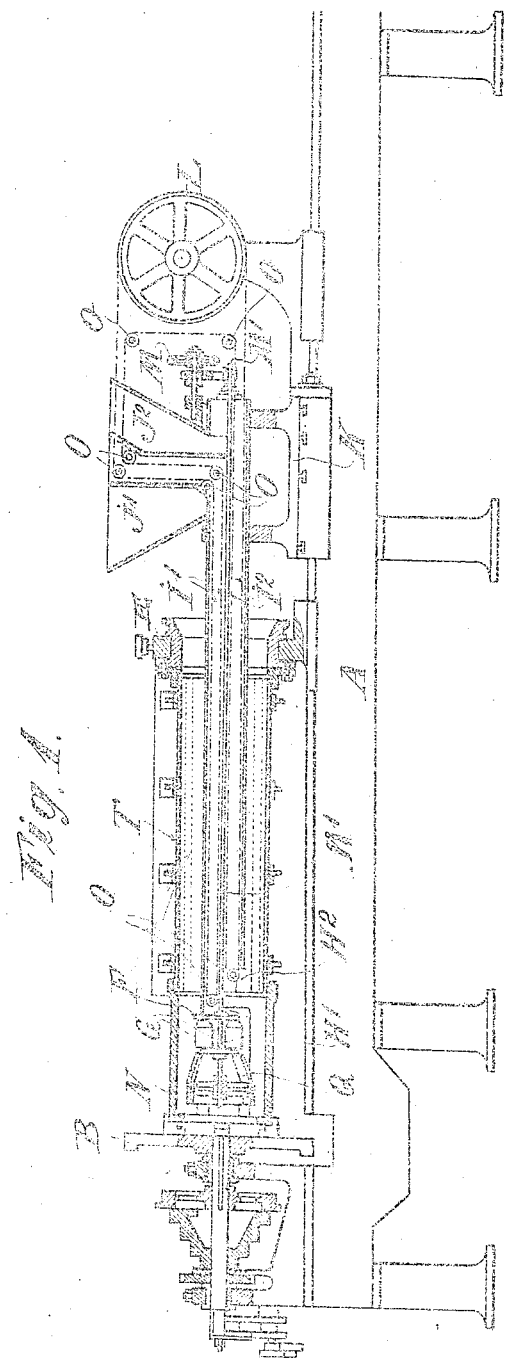

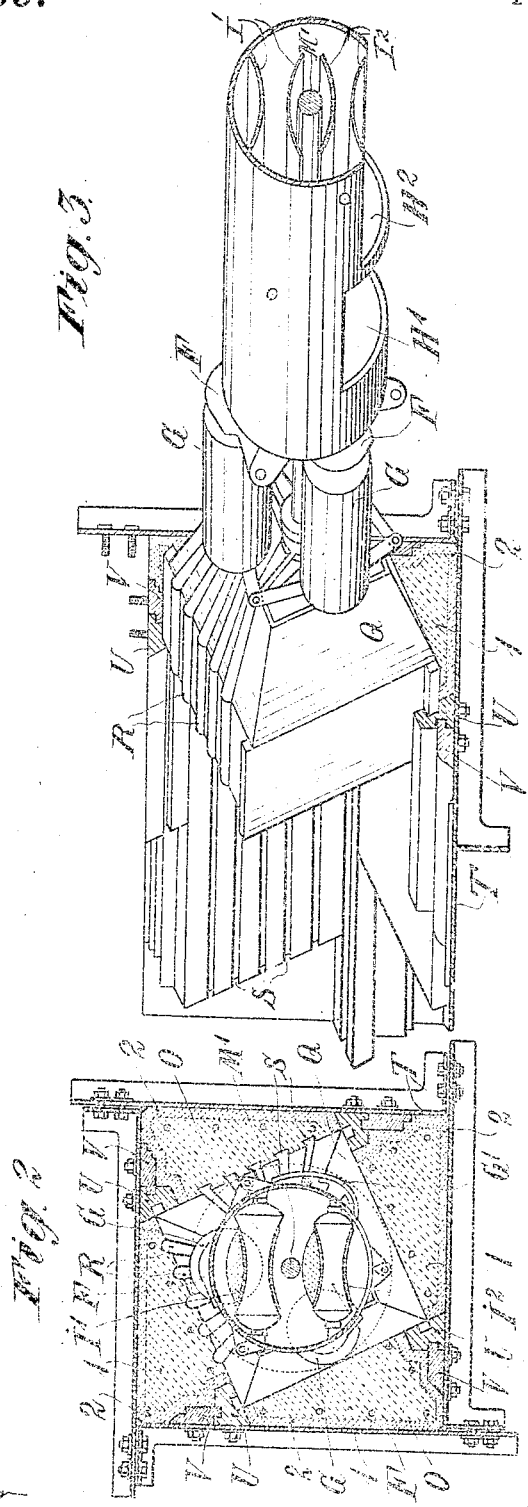

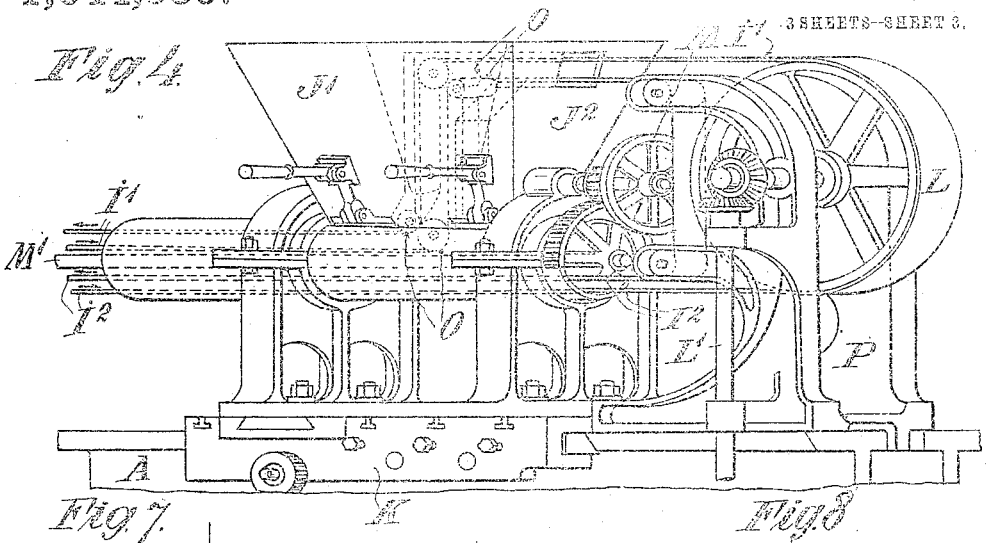
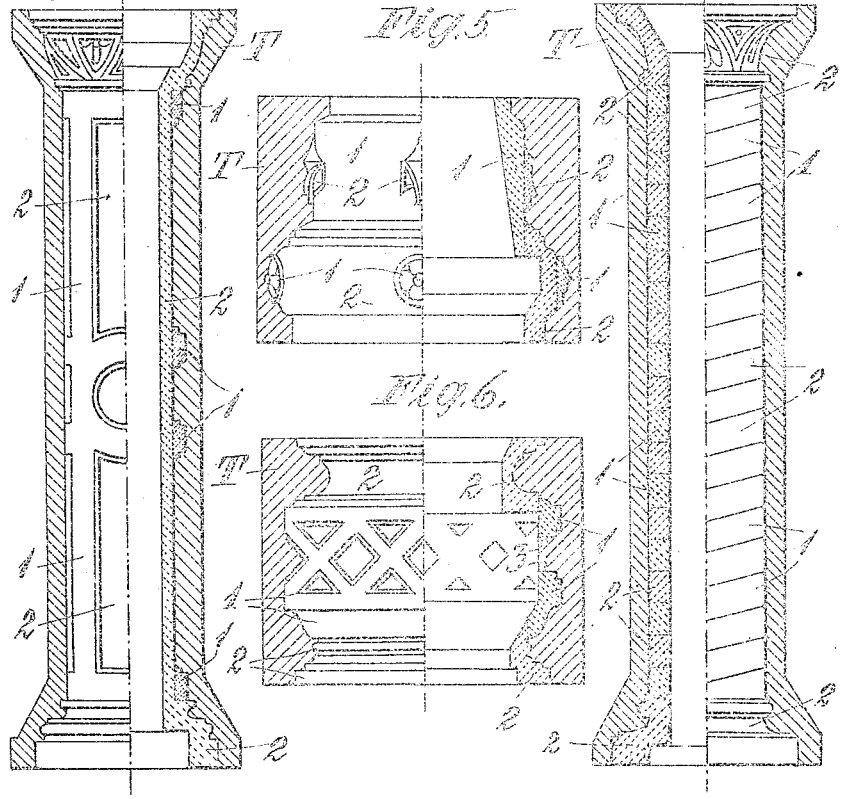

HANS WEWERKA, OF TEPLITZ-TURN, AUSTRIA-HUNGARY.

PROCESS FOR THE PRODUCTION OF HOLLOW OR SOLID BODIES OF CONCRETE, ARTIFICIAL STONE OR CLAY, OR SIMILAR PLASTIC MATERIAL.

1,044,959.  Specification of Letters Patent.  Patented Nov. 19, 1912.

Application filed March 17, 1910. Serial No. 550,029.

*To all whom it may concern:*

Be it known that I, HANS WEWERKA, a citizen of Austria, and resident of Teplitz-Turn, Bohemia, Empire of Austria-Hungary, have invented certain new and useful Improvements in Processes for the Production of Hollow or Solid Bodies of Concrete, Artificial Stone or Clay, or Similar Plastic Material, of which the following is a specification.

In the specification forming part of my application for Letters Patent Ser. No. 519,550, filed September 25th, 1909, I have explained my invention relating to a process or method for the production of hollow objects of plastic material of any internal or external profile or of any length within the limits of the apparatus.

Now the present invention relates to a process for producing objects which individually are solid but which are adapted to be grouped so as to inclose a hollow space, as for example, stair-treads, slabs and the like and furthermore to the production of solid or hollow objects of two or more materials differing in color or structure, which materials are either superposed or are situated side by side and are sharply defined and finally objects of ornamental nature which may be closed at the ends or have openwork sides, can be produced all by the aid of centrifugal action and internal pressure.

The employment of centrifugal action in the production of hollow objects of cement, has already been proposed, but in such case only a viscid substance was treated by itself in a vertical centrifugal machine, a rigid non-yielding shaving and smoothing appliance being used, which had to be selected to suit the particular internal profile, and which did not exert any pressure internally, or a quite liquid substance was treated in a mold closed at both ends for the purpose of driving excess of water to the interior; whereas, in the present case, the loose and merely plastic material, is introduced by a suitable contrivance into a horizontally rotating mold open at both ends, in which the internal molding of the hollow-body is directly effected by shaving devices, pressure rollers and smoothing contrivances, operating, in conjunction with the centrifugal action, on the interior of the hollow object to be formed, thereby influencing the form as well as the thickness of the walls, the degree of compression i. e. the consolidation of the material, however, depending upon the internal adjustable pressing contrivance.

Any ordinary high speed face-plate traversing lathe can be used for carrying out the process, to the face-plate of which lathe is secured the two or multiple-piece mold, corresponding to the external form of the hollow object which is to be produced.

The mold, open at both ends, may be built up of a plurality of sections of suitable lengths, according to the length of the object to be produced, and is supported at appropriate situations by suitable collar-bearings, so that it revolves truly horizontally and coaxially with the face-plate, one of its open ends, however, being exposed for permitting operations within its interior. In this rotating mold, for reinforced objects a reinforcement, which preferably is in the form of wire fabric or netting, is inserted and secured at a suitable distance from the internal surface of the mold. The concrete, artificial stone or the clay is now introduced by a conveyer contrivance into the interior, at a rate corresponding to the desired thickness of wall, which on the one hand as a consequence of the rotation of the mold, and also of the longitudinal motion which is impressed upon the conveyer device, is, by virtue of the centrifugal action distributed helically, uniformly and loosely upon the internal periphery of the mold, whereupon it simultaneously penetrates the meshes of the reinforcement, and on the other hand the necessary consolidation is brought about by a shaving, pressure and smoothing contrivance, set to the clear internal diameter of the hollow body, which is being formed.

In the accompanying drawing:—Figure 1 is a longitudinal section of the device for carrying out the method with two different materials, together with a suitable construction of device for feeding the materials. Fig. 2 is a transverse section of a mold and device for feeding the material for producing reinforced step treads with concrete cores and a facing of fine material, and Fig. 3 is a corresponding longitudinal section in isometric projection. Fig. 4 is an isometric view of the device for feeding the material belonging to the machine seen in Fig. 1. Fig. 5 is a longitudinal section of a mold for the production of vases with superposed portions of differently colored materials, one-half of the vase being shown in section in order to show the arrangement of the different materials. Fig. 6 is a view similar to Fig. 5 illustrating the production of a vase of two different materials with openings in the wall thereof. Fig. 7 is a longitudinal section of a mold for the production of columns with ornamentations in the form of bands of material colored differently from and superposed on the shaft, and Fig. 8 is a similar view illustrating the production of a column having a shaft composed of two helically disposed adjacent bands of material.

The machine for carrying out the process is the same, as described in my application Ser. No. 519,550, but the conveyer which is mounted on the slide-rest K is replaced by a multiple conveyer, this being easily accomplished. The closed-ended tube, which at its front end carries the shaving, pressing and smoothing contrivance and at its rear end is secured to the slide-rest which carries a pair of hoppers for the material, contains an endless conveyer belt $I^1$ $I^2$, which, for producing objects in two colors, simultaneously supplies from two separate hoppers $J^1$ $J^2$ two different materials to outlets $H^1$ $H^2$ similarly separated, so that the materials are delivered helically into the mold either superposed or side by side, in accordance with the rate of axial advance.

The slide-rest K may be directly in engagement with a suitable traversing screw (such as C shown in my aforesaid prior application Serial No. 519,550) while the pulley L for driving the transporter belt is, by means of intermediate gearing, indirectly in engagement with such traversing screw; furthermore, the wiping, pressing and smoothing device F, G, G' can be driven by the spindle M', the wheel M, and suitable intermediate gearing (such as $b$, $c$, $d$, $f$, shown in my aforesaid prior application) in the described manner so as to correspond with the rate of feed. The conveyer belt, by virtue of the position of its ball-bearing guide-rollers O, provides two separate paths of feed which convey the material separately in one direction loosely and quietly to the outlets. This method of feeding the rotating mold T, by reason of the conveyance being quiet, requiring little power, also rapid and, what is especially desirable, loose, is of great advantage, for producing hollow objects of concrete and artificial stone as well as other hardening substances for, as already mentioned the materials arrive loosely in the mold and accordingly uniformly and accurately penetrate the meshes of the reinforcement and are deposited helically in a uniform thickness upon or adjacent to each other.

Not merely two materials can be simultaneously or alternately introduced into the mold, but also with suitable inclosing tubes and with the conveyer belt led to and fro a corresponding number of times, any desired number of materials may be simultaneously or alternately introduced.

Referring to Figs. 2 and 3 which illustrate the method of producing according to this invention concrete stair-treads faced on the upper surface and front edge with an artificial stone-material by the aid of the machine shown in Figs. 1 and 4, T is a mold which can be taken to pieces and which is suitably adjustable and permits the simultaneous production of four treads of similar or different profiles. This mold is connected to the face-plate B by drum N and is rotatably mounted in the collar-bearing E so as to rotate horizontally and truly centrally; combined with the wiping and pressing device F, G is a wedge-shaped longitudinally-displaceable former Q which participates in the rotation of the mold. The former Q is guided by guide-rails U which are adjustably secured together with interchangeable profile-determining strips V, to the wall of the mold T.

The stair-treads are situated with the tread and profile surfaces against the surface of the adjustable mold, as shown in Fig. 2, and it is therefore possible to adjust these in height and width.

The reinforcement is as usual first introduced into the mold and secured therein. On the mold being set in rotation, after the feeding contrivance has been inserted, the artificial stone material is first deposited from the hopper $J^2$, on the inner surface of the mold, which it coats helically, whereupon after the deposit of a coating equal in width to the outlet $H^2$ and after the withdrawal of a shutter in the hopper $J^1$, the concrete or other material for the core is delivered from the latter $J^1$ at the desired accurately adjusted rate, helically upon the first coating. The shaving, pressing and smoothing contrivance F—G at once comes into operation as in the production of other hollow objects, the rotating wedge-shaped and adjustable axially moving former Q follows, imparting the correct shape and removing the superfluous core material and also effecting the consolidation.

If it is desired to form grooves in the lower surfaces of the stair-treads, for the purpose of affording a better hold for the plaster or the like by which the treads are set in a building, the former Q is provided with corresponding ribs R and S, for forming the grooves with a sharply defined outline at the desired situations.

With a facility equal to that with which stair-treads can be produced according to this process of exceptional homogeneity and quality, as already stated, other objects can be produced which when suitably arranged inclose a hollow space.

Figs. 7 and 8 illustrate the production of two columns by different modifications of the present process. A mold T corresponding to the object shown in Fig. 7 having been placed in the machine and, after the feeding contrivance has been inserted, set in rotation, colored material is first introduced into the mold from the hopper $J^2$ by the belt I thereby forming a capital 2. The feeding contrivance having advanced the amount corresponding to the depth of the capital 2, after suspending the supply of material from $J^2$ by closing a shutter, differently colored material is taken from the hopper $J^1$ and delivered. By adjusting the feed of material so as to be correspondingly alternative and by employing suitable shaving contrivances, a column is formed, the capital and base of which are alike but of which the shaft consists of visible superposed layers of material of alternate colors.

In Fig. 8 a similar process is illustrated, but however, by providing for a suitable acceleration of the rate at which the material is fed, corresponding to the increase of pitch of the helix due to the simultaneous deposit of material on the inner surface of the mold, the shaft of a column is formed wound helically, according to the principle of the present invention, with two sharply defined but contiguously connected colored materials.

Fig. 5 shows a vase produced by the method according to Fig. 7 with superposed portions of other colors; the bottom of this vase, when the latter is completed, is made outside the machine and inserted in the vase.

Fig. 6 shows a vase, which is produced in the same manner, but which has open-work sides, the openings corresponding to excrescences on the mold. The material introduced into the mold will uniformly fill the recesses under the centrifugal action and after the shaving, pressing and smoothing contrivance has worked thereon, an open-work object is produced.

Glass and stone mosaics can also be produced in a simple and efficient manner, by adhering colored glass or stone mosaic cubes to a suitably printed or patterned paper, corresponding to the periphery of the object to be formed and securing the paper at appropriate positions within the mold, the filling material being then introduced and operated upon in the above described manner.

Pipes with an internal acid-proof lining can easily and accurately be made by this process with the aid of the apparatus shown in Fig. 1, the material from the hopper $J^2$, consisting of ordinary concrete, being first introduced into the mold penetrating the reinforcement, while the acid-proof substance from the hopper $J^1$ merely imparts a facing which is acted upon by the following shaving, pressing and smoothing contrivance similarly to other pipes. An absolutely homogeneous and perfect product is obtained by this method.

It has now been demonstrated, that according to this process, with a separable mold permitting the simultaneous introduction of material, objects can be produced which have no hollow interior by suitably grouping them to inclose a hollow space as for example, stair-treads, slabs, etc., and also ornamental objects can be produced such as columns, vases, pedestals, etc., in round triangular, four or more cornered internal and external profiles with coiled, smooth open-work, interrupted or closed bodies which may be reinforced or unreinforced.

Having now particularly described and ascertained the nature of my said invention and in what manner the same is to be performed, I declare that what I claim is:—

1. The herein described method of producing from plastic material objects which have a hollow interior of polygonal form or which when grouped inclose a hollow space which consists in feeding the material in independent helical strips alternately into a rapidly rotating mold, and then subjecting the strips in succession as they are fed into the mold to interior wiping and pressing actions whereby to cause the strips to be forced outwardly and their inner surfaces to be evened off.

2. The herein described method of producing from plastic material objects having a hollow interior of polygonal section and composed of a core or inner layer of one material and an outer layer of a different material which consists in feeding the two materials in independent helical strips into a rapidly rotating mold whereby one strip will form the outer layer and the other strip will form the inner layer or core, and subjecting the two strips to wiping and pressing actions whereby to cause the strips to be forced outwardly and their inner surfaces to be evened off.

Signed at Vienna, in Lower Austria and Austria-Hungary, this 29th day of December, A. D. 1909.

HANS WEWERKA.

Witnesses:
  WILHELM BERGER,
  AUGUST FUCHER.